United States Patent
Zhang et al.

(10) Patent No.: US 11,492,447 B2
(45) Date of Patent: Nov. 8, 2022

(54) CRYSTALLINE POLYTHIOCARBONATE AND PREPARATION METHOD THEREFOR

(71) Applicant: ZHEJIANG UNIVERSITY, Hangzhou (CN)

(72) Inventors: Xinghong Zhang, Hangzhou (CN); Jialiang Yang, Hangzhou (CN); Xuyang Zhang, Hangzhou (CN)

(*) Notice: Subject to any disclaimer, the term of this patent is extended or adjusted under 35 U.S.C. 154(b) by 0 days.

(21) Appl. No.: 17/553,718

(22) Filed: Dec. 16, 2021

(65) Prior Publication Data

US 2022/0106445 A1    Apr. 7, 2022

Related U.S. Application Data

(63) Continuation of application No. PCT/CN2020/102321, filed on Jul. 16, 2020.

(30) Foreign Application Priority Data

Jul. 22, 2019 (CN) .................. 201910659796.4

(51) Int. Cl.
| | |
|---|---|
| C08G 75/28 | (2006.01) |
| C08F 2/38 | (2006.01) |
| C08F 222/06 | (2006.01) |
| C08G 63/08 | (2006.01) |
| C08G 64/30 | (2006.01) |
| C08G 64/38 | (2006.01) |

(52) U.S. Cl.
CPC ............ *C08G 75/28* (2013.01); *C08F 2/38* (2013.01); *C08F 222/06* (2013.01); *C08G 63/08* (2013.01); *C08G 64/302* (2013.01); *C08G 64/38* (2013.01); *C08G 2230/00* (2013.01); *C08G 2250/00* (2013.01)

(58) Field of Classification Search
None
See application file for complete search history.

(56) References Cited

U.S. PATENT DOCUMENTS

| 2003/0120101 A1 | 6/2003 | Lai |
| 2021/0163681 A1* | 6/2021 | Mueller .............. C08G 64/38 |

FOREIGN PATENT DOCUMENTS

| CN | 103275313 A | 9/2013 |
| CN | 103275314 A | 9/2013 |
| CN | 106243336 A | 12/2016 |
| CN | 106866952 A | 6/2017 |
| CN | 109180937 A | 1/2019 |
| CN | 109705331 A | 5/2019 |
| CN | 110396196 A | 11/2019 |
| WO | 2018114837 A1 | 6/2018 |
| WO | WO-2018114837 A1 * | 6/2018 ......... C08G 18/5072 |

OTHER PUBLICATIONS

Luo, et al., "An Investigation of the Pathways for Oxygen/Sulfur Scramblings during the Copolymerization of Carbon Disulfide and Oxetane", Macromolecules, 48, 5526-5532, Aug. 7, 2015. (Year: 2015).*

Luo, et al. "Using carbon dioxide and its sulfur analogues as monomers in polymer synthesis", Polymer, 82, 406-431, Nov. 6, 2015. (Year: 2015).*

Yang, et al., "Enabling Oxygen-Sulfur Exchange Reaction to Produce Semicrystalline Copolymers from Carbon Disulfide and Ethylene Oxide", Macromolecular Rapid Communications, 42, 2000472, Nov. 18, 2020. (Year: 2020).*

Internation Search Report of PCT/CN2020/102321, dated Oct. 22, 2020.

Zhang Xinghong et al., "Atom-Exchange Coordination Polymerization of Carbon Disulfide and Propylene Oxide by a Highly Effective Double-Metal Cyanide Complex", Macromolecules, vol. 41, No. 5, Feb. 14 p. 1588, left-hand column, paragraphs 2-3 and p. 1589, table 2.

Zhang Xinghong et al. "Copolymerization of Carbon Disulfide and Cyclohexene Oxide With a Double-Metal Cyanide Complex Catalyst", «Acta Polymerica Sinica» , Jul. 22, 2009, pp. 546-552.

* cited by examiner

*Primary Examiner* — Christopher M Rodd

(57) ABSTRACT

The present disclosure provides a crystalline polythiocarbonate and a preparation method thereof. The crystalline polythiocarbonate is a random copolymer and includes five structural units L1 to L5 as shown in the following formula. The method includes carrying out a polymerization reaction natively or in solution using carbon disulfide, ethylene oxide, selectively added third monomer, initiator, Lewis acid, selectively added chain transfer agent, and selectively added solvent as raw materials. This method provides a new way for high value-added application of carbon disulfide and ethylene oxide by using inexpensive carbon disulfide and ethylene oxide as monomers; the product is a random copolymerized crystalline polythiocarbonate with novel structure, which has various chain link structures and excellent mechanical properties, processing properties and degradability.

17 Claims, 3 Drawing Sheets

CRYSTALLINE POLYTHIOCARBONATE AND PREPARATION METHOD THEREFOR

CROSS-REFERENCE TO RELATED APPLICATIONS

This application is a continuation of International Patent Application No. PCT/CN2020/102321 with a filing date of Jul. 16, 2020, designating the United States, now pending, and further claims priority to Chinese Patent Application No. 201910659796.4 with a filing date of Jul. 22, 2019. The content of the aforementioned applications, including any intervening amendments thereto, are incorporated herein by reference.

TECHNICAL FIELD

The present disclosure relates to the field of polymer material technologies, and in particular to a crystalline polythiocarbonate and a preparation method thereof.

BACKGROUND

Crystalline polymers generally have excellent mechanical properties and good processing properties, and have the largest yields and the widest use in the modern polymer industry. However, the most widely used kind, the crystalline polyolefin material, is not biodegradable, and its heavy use has put tremendous pressure on the ecological environment. Most of the biodegradable polymers reported are not crystalline, so they have struggled to match the performance of olefin polymers.

A few typical biodegradable crystalline polymers such as polycaprolactone, polylactic acid or crystalline polymonothiocarbonates derived from oxetane have difficulty competing with polyolefins due to their poor performance or high cost. For example, polycaprolactone is a biodegradable crystalline polymer containing no chiral carbon atoms, but its melting point is only 50 to 60° C., thus it is difficult to apply polycaprolactone alone in many cases. For another example, polylactic acid is a typical crystalline polymer with a chiral structure and a melting point of 170° C. However, melt processing is highly susceptible to degradation due to its inherent susceptibility to degradation and hydrolysis properties at high temperatures. In addition, crystalline polymonothiocarbonate prepared from carbonyl sulfide (COS) and oxetane has a melting point of about 130° C., which satisfies the performance requirements of use, but the production cost is high.

Therefore, the development of a crystalline polymer that is low-cost, biodegradable, and comparable in performance to olefin polymers is still an urgent problem to be solved.

Carbon disulfide ($CS_2$) and ethylene oxide (EO) are important basic chemical raw materials. The former mainly comes from reaction of coke or natural gas with sulfur (derived from sulfur ore, refining enterprises, etc.), and the cost is very low; it is widely used in the fields of man-made fibers (viscose short fibers), rubber, oil refining, etc. Global $CS_2$ production reached about 1.2 million tons in 2017, of which China produced about 700,000 tons. Although China has advanced technology for producing $CS_2$, it lacks high-value downstream products. EO is one of the important derivatives of the ethylene industry and mainly used in the production of polyether polyols, polyester fibers, resins, etc. In 2016, global EO production capacity reached 34.5 million tons/year, of which China's production capacity is nearly 8 million tons/year. However, with the current global EO overcapacity and slowing down of downstream demand growth, EO is urgently required to find a new way out.

SUMMARY OF THE DISCLOSURE

Based on the above problems in the prior art, the present disclosure provides a crystalline polythiocarbonate and a preparation method thereof. This method provides a new way for high value-added application of carbon disulfide and ethylene oxide by using inexpensive carbon disulfide and ethylene oxide as monomers; the product is a random copolymerized crystalline polythiocarbonate with novel structure, which is biodegradable and has excellent mechanical and processing properties comparable to those of olefin polymers.

Detailed technical solutions as followed.

The present disclosure provides a crystalline polythiocarbonate, being a random copolymer and comprising five structural units L1 to L5 as shown in the following formula:

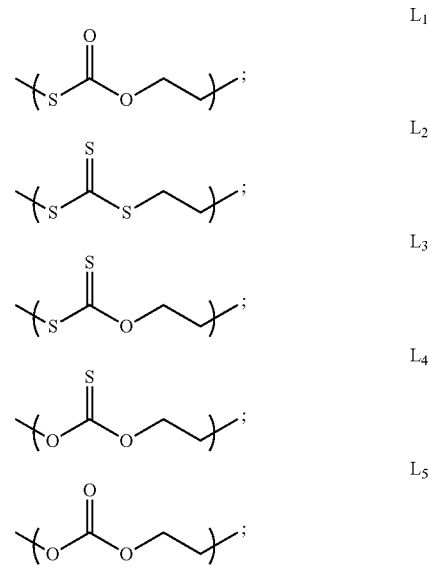

wherein the structural unit L1 has a molar content of 10~80%, the structural unit L2 has a molar content of 10~80%, the structural unit L3 has a molar content of <15%, the structural unit L4 has a molar content of <10%, and the structural unit L5 has a molar content of ≤10%.

The molar content of the structural units L3, L4 and L5 are not 0.

The preparation method of the crystalline polythiocarbonate includes:

co-mixing carbon disulfide, ethylene oxide, an initiator, a Lewis acid, a selectively added chain transfer agent, and a selectively added solvent in a reactor and carrying out a native or solution copolymerization reaction at 0~150° C. under autogenous pressure.

Based on many experimental studies, the present disclosure breaks through the traditional thinking and gives up the idea of inhibiting the "oxygen-sulfur exchange" reaction, which is commonly used in the industry, and instead uses the "oxygen-sulfur exchange" reaction in the copolymerization process of carbon disulfide to guide the occurrence of polymerization reaction. In this way, a new type of polythiocarbonate with five structural units in the main chain structure and adjustable crystallization properties is prepared. The product has a degradable thiocarbonate structure and can crystallize like high-density polyethylene, with a wide processing window and high strength and toughness.

It is found that carbon disulfide can only be reacted with ethylene oxide in the above system to produce crystalline polythiocarbonate including the above five structural units. The crystalline polythiocarbonate is mainly composed of the structural units L1 and L2, which have excellent crystallization properties. By screening the special Lewis acid-base system and controlling the feeding ratio of each raw material and the conditions of the polymerization reaction, the molar content of the structural units L1 and L2 in the polymer can be adjusted, and the properties of the prepared polymer can be varied between those of a thermoplastic elastomer and those of a crystalline plastic. By screening the above process conditions, it is also possible to adjust the content of structural unit L5, thus further modulating the degradation properties of the crystalline polythiocarbonate.

Preferably, the structural unit L1 has a molar content of 30~55%, the structural unit L2 has a molar content of 30~55%, the structural unit L3 has a molar content of <15%, the structural unit L4 has a molar content of <10%, and the structural unit L5 has a molar content of ≤10%. Further, the structural unit L3 has a molar content of ≥4%, the structural unit L4 has a molar content of ≥2%, and the structural unit L5 has a molar content of ≥4%.

It is found that the crystalline polythiocarbonate prepared has moderate crystalline properties and optimal mechanical, processable and degradable properties. In the preparation process described:

The molar ratio of carbon disulfide to ethylene oxide is 0.5~5:1, preferably 0.5~3:1. The excess of carbon disulfide helps to direct the "oxygen-sulfur exchange" reaction toward the crystalline chain link, which can enrich more sulfur atoms in the polymer main chain and improve the crystallization ability of the polymer.

The initiator is selected from at least one of 1,8-diazabicyclo[5.4.0]undec-7-carbene (DBU), 1,5,7-diazabicyclo[5.4.0]undec-7-carbene (TBD), 4-dimethylaminopyridine (DMAP), tetraalkylammonium halide, cetyltrimethylammnium bromide (CTAB), bis(triphenylphosphinyl)ammonium chloride ([PPN]Cl), N,N N,N',N'-tetramethylmethanediamine (TMDM), N,N,N',N'-tetraethylethylenediamine (TEED), and tetraalkylphosphine halide. Preferably, the initiator is selected from at least one of DBU, TBD, DMAP, CTAB. The preferred initiator facilitates the direction of the "oxygen-sulfur exchange" reaction toward the formation of crystalline links.

The molar ratio of the initiator to the ethylene oxide is from 1:100 to 4000; preferably from 1:200 to 1500. In the preferred range, the copolymerization reaction can proceed quickly and smoothly, yielding a medium to high molecular weight product, corresponding to a polymer that is usually able to combine both mechanical and thermal properties.

The Lewis acid is selected from at least one of triethylboron, tripropylboron, tributylboron, triphenylboron, tris(pentafluorophenyl)boron, di(trimethylphenyl)fluoroboron, trimethylaluminum, triethylaluminum, and 3,5-Di-tert-butylsalicylaldehyde imide Schiff base chromium complex.

The structural formula of the 3,5-Di-tert-butylsalicylaldehyde imide Schiff base chromium complex is shown in the following formula:

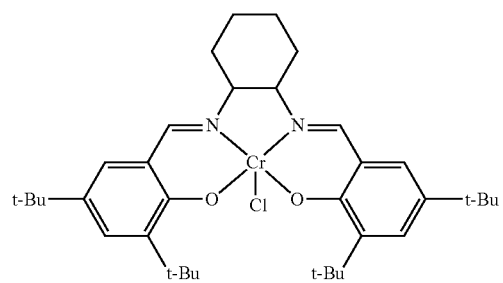

Preferably, the Lewis acid is selected from at least one of triethylboron, trimethylaluminum, triphenylboron, and tris(pentafluorophenyl)boron, which can serve to better stabilize the chain end active growth centers during polymerization.

Preferably, the molar ratio of the Lewis acid to the initiator is from 1:0.5 to 2; preferably 1:1. Equivalent amounts of Lewis acid and initiator can ensure higher initiation efficiency and help control the molecular weight and molecular weight distribution of the product.

In this preparation process, the chain transfer agent may be added selectively according to demands; the species of the chain transfer agent has no special requirement, and can be chosen from the species commonly found in the art, such as water, alcohol, organic carboxylic acid, remote claw polymer, etc.

The alcohol is selected from dihydroxy alcohols, such as ethylene glycol, 1,3-propanediol, 1,4-butanediol, 1,6-hexanediol and other common varieties.

The organic carboxylic acid is selected from dicarboxylic acids such as butanedioic acid, glutaric acid, adipic acid, etc.

When a remote claw polymer is used as the chain transfer agent, a remote claw polymer with a hydroxyl or carboxyl end group and a molecular weight of 200 to 8000 g/mol is preferred.

The amount of the chain transfer agent is calculated as the molar ratio of the reactive group carried by the chain transfer agent to the raw material monomer ethylene oxide. In a case of alcohol, the amount of the chain transfer agent is calculated as the molar ratio of the hydroxyl group to ethylene oxide; in the case of organic carboxylic acid, the molar ratio of the carboxyl group to ethylene oxide. In a case of remote claw polymer, the amount of the chain transfer agent is calculated as the molar ratio of the end group to ethylene oxide, preferably, the molar ratio is 1:20 to 100, further preferably 5:10 to 100, and further preferably 5:100. The preferred chain transfer agent ratio helps to control the molecular weight of the product and obtain a polymer with excellent overall performance.

In the present disclosure, the solvent may be added selectively, and the concentration of initiator and monomer can be changed by adding solvent, thus affecting the selectivity of the product structure. The solvent is selected from at least one of tetrahydrofuran, dimethyl sulfoxide, trichlorobenzene, and dimethyl formamide.

The volume ratio of the solvent to ethylene oxide is from 1 to 5:1, preferably from 1 to 2:1. The addition of 1 to 2 times the volume of solvent ensures that the copolymer is prepared with both mechanical and crystalline properties.

Preferably, the polymerization reaction is carried out at 60~120° C. under autogenous pressure.

The product obtained after the native or solution copolymerization reaction is also subjected to post-treatment, including purification and drying.

Further preferably:

The molar ratio of carbon disulfide to ethylene oxide is from 1.5 to 2:1. The initiator is selected from DBU or DMAP.

The Lewis acid is selected from triethylboron or trimethylaluminum.

The polymerization reaction is carried out at 80° C. under autogenous pressure. It is found that the copolymer prepared under further preferred process conditions has a moderate crystallinity and melting temperature, as well as a suitable molecular weight.

Further preferably:

The molar ratio of the initiator, ethylene oxide and carbon disulfide is 1:2000:3000. In this case, the copolymer prepared has a better suitable molecular weight with a smaller molecular weight distribution.

Based on the above-mentioned crystallizable polythiocarbonate containing five structural units L1 to L5, a third monomer is introduced into the polymer chain segment, such that the molecular chain segment of the crystallizable polythiocarbonate also includes a polyether or polyester link produced by the copolymerization of the third monomer, thereby further optimizing the properties of the product, including mechanical properties, thermal properties, processing properties, and degradability properties.

The introduction of the third monomer can be done by a one-step preparation process or a two-step preparation process. The one-step preparation process is simpler but less controllable, while the two-step preparation process has higher controllability and different preparation processes can be selected according to the actual production conditions and the performance requirements of the polymer.

The one-step preparation process includes:

co-mixing carbon disulfide, ethylene oxide, a third monomer, an initiator, a Lewis acid, a selectively added chain transfer agent, and a selectively added solvent in a reactor, and carrying out a native or solution copolymerization reaction at 0~150° C. under autogenous pressure.

The third monomer is selected from at least one of cyclic anhydride, and cyclic lactone.

The cyclic anhydride is selected from at least one of maleic anhydride, glutaric anhydride, succinic anhydride, diglycolic anhydride, and phthalic anhydride.

The cyclic lactone is selected from at least one of ethyl cross-ester, propyl cross-ester (lactide), butyl lactone, pentyl lactone, hexyl lactone, heptyl lactone, and dimethyl trimethylene ester.

Preferably, the molar ratio of the third monomer to ethylene oxide is from 0.1 to 100:100; preferably from 5 to 20:100. It is found that an appropriate amount of the third monomer ensures a high crystalline property of the copolymer.

Further preferably, the third monomer is selected from maleic anhydride or propyl cross ester. It is found that the addition of the third monomer can further increase the molecular weight of the product.

It is further preferred to choose maleic anhydride as the third monomer. It is found that using propylene oxide as the third monomer, the polymer is prepared with high molecular weight and moderate crystallinity.

The two-step preparation process includes:

co-mixing an initiator, a Lewis acid, the third monomer and a selectively added solvent in a reactor and carrying out a native or solution copolymerization reaction at 0~150° C. under autogenous pressure, to obtain a polyether intermediate or a polyester intermediate with a target molecular weight; and co-mixing the polyether intermediate or the polyester intermediate with the target molecular weight with carbon disulfide, ethylene oxide and a selectively added solvent in the reactor, carrying out a second stage reaction in a native or solution at 0~150° C. under autogenous pressure, and obtaining a final product by post-processing;

As determined by gel permeation chromatography, the number-average molecular weight of the crystallizable polythiocarbonate prepared by the present disclosure is 1~100 kg/mol, and the molecular weight distribution is 1.1~5.0.

The crystallinity of the crystallizable polythiocarbonate prepared by the present disclosure is 1~78% as determined by X-ray diffraction.

The melting temperature of the crystallizable poly(thiocarbonate) prepared by the present disclosure is 117~245° C. and the enthalpy of melting is 1.1-70 J/g as determined by differential scanning calorimetry.

Compared with the prior art, the present disclosure has the following advantages:

The present disclosure breaks through the limitation of the method of inhibiting the "oxygen-sulfur exchange" reaction in the prior art, and proposes the idea of using the "oxygen-sulfur exchange" reaction to prepare crystalline copolymers for the first time, and proposes a method of preparing crystalline polythiocarbonate under the guidance of this method.

The present preparation method uses the inexpensive raw material ethylene oxide and carbon disulfide as monomers to prepare a novel structure of random copolymerizable crystallizable polythiocarbonate, containing five link structures, which can be rapidly crystallized, with high melting point and large melting enthalpy, and excellent mechanical properties and degradability. The preparation method provides a new way for the high value-added application of carbon disulfide and ethylene oxide, and by screening the special Lewis acid-base system and controlling the feeding ratio of each raw material and the conditions of polymerization reaction, the link structure and crystallinity in the polymer can be adjusted, and thus the properties of the products can be regulated.

Based on this, in order to further optimize the properties of the products, including mechanical properties, thermal properties, processing properties and degradable properties, the present disclosure also proposes the preparation of crystallizable polythiocarbonate by a one-step or two-step method with ethylene oxide and carbon disulfide as the main monomers and the addition of a third monomer, which has the advantages of simple preparation process, flexibility and manipulability.

DETAILED DESCRIPTION

Figure 1:
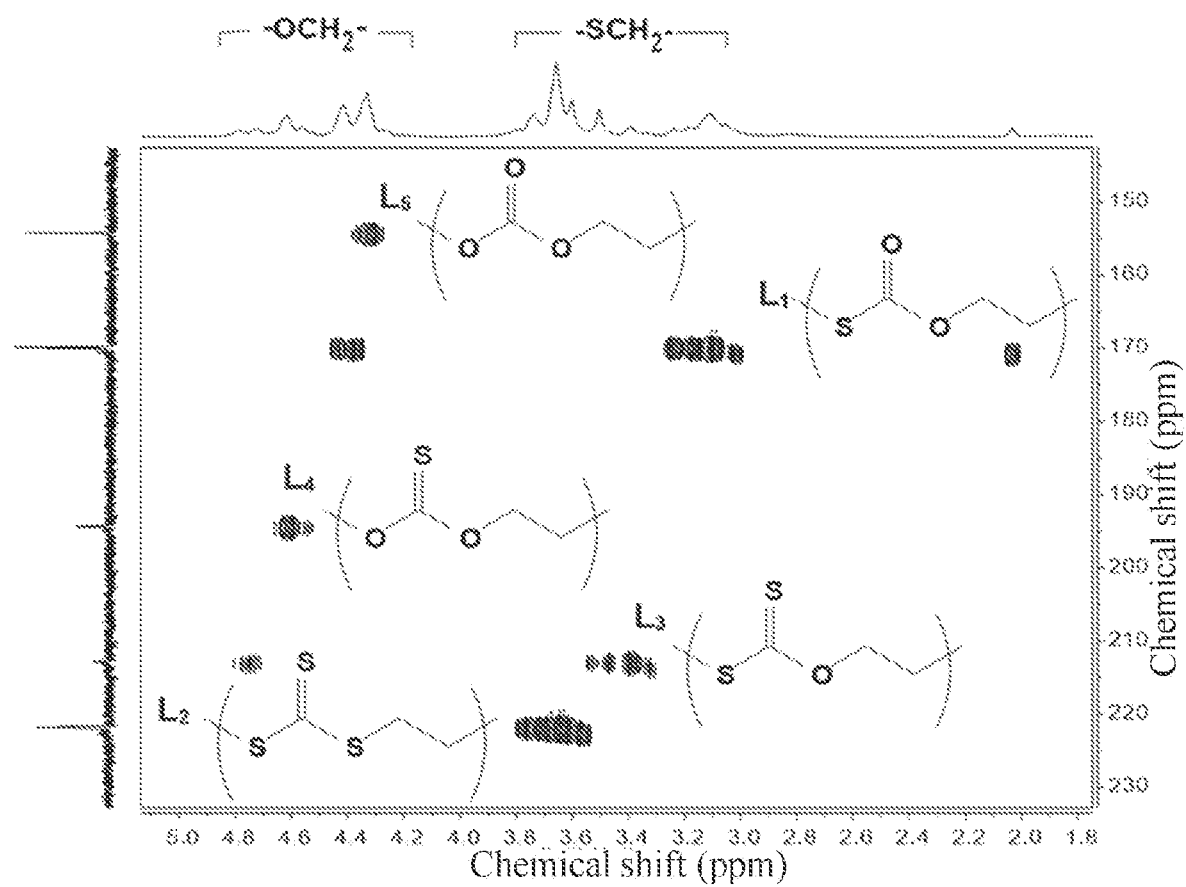
FIG. 1 is a $^1H$-$^{13}C$ HMBC spectrum of a $CS_2$/EO copolymerization product prepared in Embodiment 1 of the present disclosure.
Figure 2:
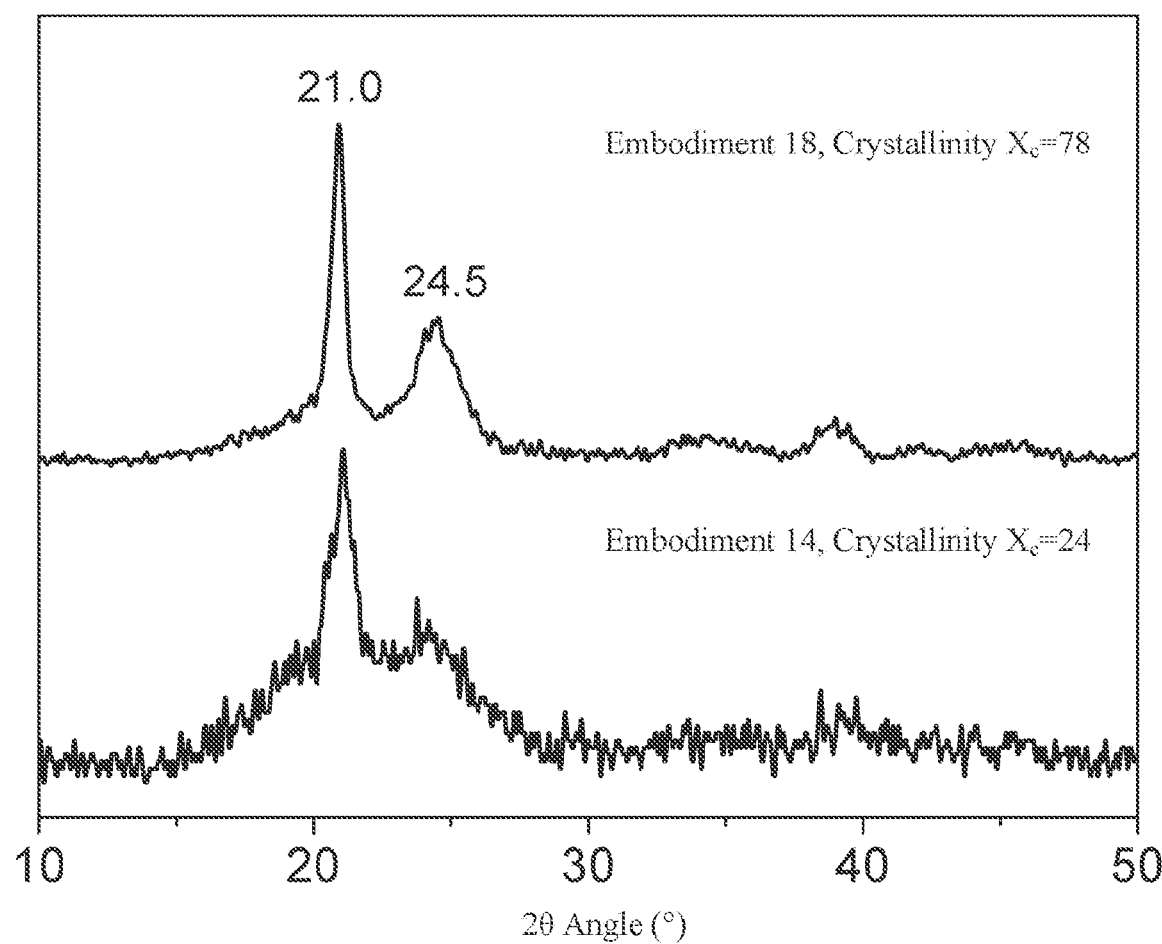
FIG. 2 is an XRD pattern of a $CS_2$/EO copolymerization product prepared in Embodiment 14 and Embodiment 18 of the present disclosure, respectively.

In order to describe the present disclosure more specifically, the technical solutions of the present disclosure will be described in detail below with reference to the accompanying drawings and specific embodiments.

For convenience of distinction, the Lewis acids used in the following embodiments are numbered separately as A1 for triethylboron, A2 for tripropylboron, A3 for tributylboron, A4 for triphenylboron, A5 for tris(pentafluorophenyl) boron, A6 for di(trimethylphenyl)fluoroboron, A7 for trimethylaluminum, A8 for triethylaluminum, and A9 for 3,5-di-tert-butylsalicylimine Schiff base chromium complex.

Embodiment 1: One-Pot Copolymerization of $CS_2$/EO to Synthesize Polythiocarbonate Before the polymerization, a 10 mL autoclave is placed at 110° C. for about 2 hours to remove water and cooled to room temperature in a desiccator. The Lewis acid A1 and an initiator 1,8-diazabicyclo[5.4.0]undec-7-carbene (DBU) are sequentially added to the autoclave in equimolar quantities. The molar ratio of initiator to monomer EO is 1/2000. 2 mL of $CS_2$ and 1.1 mL of EO (molar ratio of $CS_2$ to EO being 1.5:1) are added. The autoclave is then closed and placed in an 80° C. oil bath for 12 hours under autogenous pressure. After the reaction is completed, it is cooled to room temperature, and a yellow product is taken out. The crude product is first dissolved in dimethyl sulfoxide (DMSO) to 240° C. A polymer is precipitated in methanol, washed three times to obtain a pure product without catalyst, and dried under vacuum to constant weight. The conversion rate is calculated and obtained by the weighing method. The composition of each link in the polymer is detected by nuclear magnetic resonance spectroscopy. The molecular weight and molecular weight distribution of the polymer are determined by high temperature gel chromatography. The melting temperature of the polymer is determined by differential scanning calorimetry (DSC). The crystallinity of the polymer is determined by X-ray diffraction. The test results are shown in Table 1.

Embodiment 2: One-Pot Copolymerization of $CS_2$/EO to Synthesize Polythiocarbonate Before the polymerization, a 10 mL autoclave is placed at 110° C. for about 2 hours to remove water and cooled to room temperature in a desiccator. Several masses of Lewis acid A2 and initiator 1,8-diazabicyclo[5.4.0]undec-7-carbene (DBU) are sequentially added to the autoclave in equimolar quantities. The molar ratio of initiator to monomer EO is 1/100. 3.4 mL of $CS_2$ and 0.6 mL of EO (molar ratio of $CS_2$ to EO being 5:1) are added. The autoclave is then closed and placed in an 80° C. oil bath for 0.5 hours under autogenous pressure. After the reaction is completed, it is cooled to room temperature, and a yellow product is taken out. The crude product is first dissolved in DMSO to 240° C. A polymer is precipitated in methanol, washed three times to obtain a pure product without catalyst, and dried under vacuum to constant weight. The conversion rate is calculated and obtained by the weighing method. The composition of each link in the polymer is detected by nuclear magnetic resonance spectroscopy. The molecular weight and molecular weight distribution of the polymer are determined by high temperature gel chromatography. The melting temperature of the polymer is determined by DSC. The crystallinity of the polymer is determined by X-ray diffraction. The test results are shown in Table 1.

Embodiment 3: One-Pot Copolymerization of $CS_2$/EO to Synthesize Polythiocarbonate Before the polymerization, a 10 mL autoclave is placed at 110° C. for about 2 hours to remove water and cooled to room temperature in a desiccator. Several masses of Lewis acid A3 and initiator 1,8-diazabicyclo[5.4.0]undec-7-carbene (DBU) are sequentially added to the autoclave in equimolar quantities. The molar ratio of initiator to monomer EO is 1/1000. 1.3 mL of $CS_2$ and 1.1 mL of EO (molar ratio of $CS_2$ to EO being 1:1) are added. The autoclave is then closed and placed in an 80° C. oil bath for 48 hours under autogenous pressure. After the reaction is completed, it is cooled to room temperature, and a yellow product is taken out. The crude product is first dissolved in DMSO to 240° C. A polymer is precipitated in methanol, washed three times to obtain a pure product without catalyst, and dried under vacuum to constant weight. The conversion rate is calculated and obtained by the weighing method. The composition of each link in the polymer is detected by nuclear magnetic resonance spectroscopy. The molecular weight and molecular weight distribution of the polymer are determined by high temperature gel chromatography. The melting temperature of the polymer is determined by DSC. The crystallinity of the polymer is determined by X-ray diffraction. The test results are shown in Table 1.

Embodiment 4: One-Pot Copolymerization of $CS_2$/EO to Synthesize Polythiocarbonate Before the polymerization, a 10 mL autoclave is placed at 110° C. for about 2 hours to remove water and cooled to room temperature in a desiccator. Several masses of Lewis acid A4 and initiator 1,8-diazabicyclo[5.4.0]undec-7-carbene (DBU) are sequentially added to the autoclave in equimolar quantities. The molar ratio of initiator to monomer EO is 1/2000. 0.6 mL of $CS_2$ and 1.1 mL of EO (molar ratio of $CS_2$ to EO being 0.5:1) are added. The autoclave is then closed and placed in an 80° C. oil bath for 4 hours under autogenous pressure. After the reaction is completed, it is cooled to room temperature, and a yellow product is taken out. The crude product is first dissolved in DMSO to 240° C. A polymer is precipitated in methanol, washed three times to obtain a pure product without catalyst, and dried under vacuum to constant weight. The conversion rate is calculated and obtained by the weighing method. The composition of each link in the polymer is detected by nuclear magnetic resonance spectroscopy. The molecular weight and molecular weight distribution of the polymer are determined by high temperature gel chromatography. The melting temperature of the polymer is determined by DSC. The crystallinity of the polymer is determined by X-ray diffraction. The test results are shown in Table 1.

Embodiment 5: One-Pot Copolymerization of $CS_2$/EO to Synthesize Polythiocarbonate Before the polymerization, a 10 mL autoclave is placed at 110° C. for about 2 hours to remove water and cooled to room temperature in a desiccator. Several masses of Lewis acid A5 and initiator 1,8-diazabicyclo[5.4.0]undec-7-carbene (DBU) are sequentially added to the autoclave in equimolar quantities. The molar ratio of initiator to monomer EO is 1/500. 4 mL of $CS_2$ and 1.1 mL of EO (molar ratio of $CS_2$ to EO being 3:1) are added. The autoclave is then closed and placed in an 80° C. oil bath for 24 hours under autogenous pressure. After the reaction is completed, it is cooled to room temperature, and a yellow product is taken out. The crude product is first dissolved in DMSO to 240° C. A polymer is precipitated in methanol, washed three times to obtain a pure product without catalyst, and dried under vacuum to constant weight. The conversion rate is calculated and obtained by the weighing method. The composition of each link in the polymer is detected by nuclear magnetic resonance spectroscopy. The molecular weight and molecular weight distribution of the polymer are determined by high temperature gel chromatography. The melting temperature of the polymer is determined by DSC. The crystallinity of the polymer is determined by X-ray diffraction. The test results are shown in Table 1.

Embodiment 6: One-Pot Copolymerization of $CS_2$/EO to Synthesize Polythiocarbonate Before the polymerization, a 10 mL autoclave is placed at 110° C. for about 2 hours to remove water and cooled to room temperature in a desiccator. Several masses of Lewis acid A6 and initiator 1,8-diazabicyclo[5.4.0]undec-7-carbene (DBU) are sequentially added to the autoclave in equimolar quantities. The molar ratio of initiator to monomer EO is 1/4000. 2 mL of $CS_2$ and 1.1 mL of EO (molar ratio of $CS_2$ to EO being 1.5:1) are added. The autoclave is then closed and placed in an 80° C. oil bath for 48 hours under autogenous pressure. After the reaction is completed, it is cooled to room temperature, and a yellow product is taken out. The crude product is first dissolved in DMSO to 240° C. A polymer is precipitated in methanol, washed three times to obtain a pure product without catalyst, and dried under vacuum to constant weight. The conversion rate is calculated and obtained by the weighing method. The composition of each link in the polymer is detected by nuclear magnetic resonance spectroscopy. The molecular weight and molecular weight distribution of the polymer are determined by high temperature gel chromatography. The melting temperature of the polymer is determined by DSC. The crystallinity of the polymer is determined by X-ray diffraction. The test results are shown in Table 1.

Embodiment 7: One-Pot Copolymerization of $CS_2$/EO to Synthesize Polythiocarbonate Before the polymerization, a 10 mL autoclave is placed at 110° C. for about 2 hours to remove water and cooled to room temperature in a desiccator. Several masses of Lewis acid A7 and initiator 1,8-diazabicyclo[5.4.0]undec-7-carbene (DBU) are sequentially added to the autoclave in equimolar quantities. The molar ratio of initiator to monomer EO is 1/2000. 2.6 mL of $CS_2$ and 1.1 mL of EO (molar ratio of $CS_2$ to EO being 2:1) are added. The autoclave is then closed and placed in an 80° C. oil bath for 10 hours under autogenous pressure. After the reaction is completed, it is cooled to room temperature, and a yellow product is taken out. The crude product is first dissolved in DMSO to 240° C. A polymer is precipitated in methanol, washed three times to obtain a pure product without catalyst, and dried under vacuum to constant weight. The conversion rate is calculated and obtained by the weighing method. The composition of each link in the polymer is detected by nuclear magnetic resonance spectroscopy. The molecular weight and molecular weight distribution of the polymer are determined by high temperature gel chromatography. The melting temperature of the polymer is determined by DSC. The crystallinity of the polymer is determined by X-ray diffraction. The test results are shown in Table 1.

Embodiment 8: One-Pot Copolymerization of $CS_2$/EO to Synthesize Polythiocarbonate Before the polymerization, a 10 mL autoclave is placed at 110° C. for about 2 hours to remove water and cooled to room temperature in a desiccator. Several masses of Lewis acid A8 and initiator 1,8-diazabicyclo[5.4.0]undec-7-carbene (DBU) are sequentially added to the autoclave in equimolar quantities. The molar ratio of initiator to monomer EO is 1/750. 1.7 mL of $CS_2$ and 1.1 mL of EO (molar ratio of $CS_2$ to EO being 1.3:1) are added. The autoclave is then closed and placed in an 80° C. oil bath for 10 hours under autogenous pressure. After the reaction is completed, it is cooled to room temperature, and a yellow product is taken out. The crude product is first dissolved in DMSO to 240° C. A polymer is precipitated in methanol, washed three times to obtain a pure product without catalyst, and dried under vacuum to constant weight. The conversion rate is calculated and obtained by the weighing method. The composition of each link in the polymer is detected by nuclear magnetic resonance spectroscopy. The molecular weight and molecular weight distribution of the polymer are determined by high temperature gel chromatography. The melting temperature of the polymer is determined by DSC. The crystallinity of the polymer is determined by X-ray diffraction. The test results are shown in Table 1.

Embodiment 9: One-Pot Copolymerization of $CS_2$/EO to Synthesize Polythiocarbonate Before the polymerization, a 10 mL autoclave is placed at 110° C. for about 2 hours to remove water and cooled to room temperature in a desiccator. Several masses of Lewis acid A9 and initiator 1,8-diazabicyclo[5.4.0]undec-7-carbene (DBU) are sequentially added to the autoclave in equimolar quantities. The molar ratio of initiator to monomer EO is 1/2000. 1.3 mL of $CS_2$ and 1.1 mL of EO (molar ratio of $CS_2$ to EO being 1:1) are added. The autoclave is then closed and placed in an 80° C. oil bath for 8 hours under autogenous pressure. After the reaction is completed, it is cooled to room temperature, and a yellow product is taken out. The crude product is first dissolved in DMSO to 240° C. A polymer is precipitated in methanol, washed three times to obtain a pure product without catalyst, and dried under vacuum to constant weight. The conversion rate is calculated and obtained by the weighing method. The composition of each link in the polymer is detected by nuclear magnetic resonance spectroscopy. The molecular weight and molecular weight distribution of the polymer are determined by high temperature gel chromatography. The melting temperature of the polymer is determined by DSC. The crystallinity of the polymer is determined by X-ray diffraction. The test results are shown in Table 1.

Embodiment 10: One-Pot Copolymerization of $CS_2$/EO to Synthesize Polythiocarbonate Before the polymerization, a 10 mL autoclave is placed at 110° C. for about 2 hours to remove water and cooled to room temperature in a desiccator. Several masses of Lewis acid A1 and initiator 1,5,7-diazabicyclo[5.4.0]undec-7-carbene (TBD) are sequentially added to the autoclave in equimolar quantities. The molar ratio of initiator to monomer EO is 1/2000. 2 mL of $CS_2$ and 1.1 mL of EO (molar ratio of $CS_2$ to EO being 1.5:1) are added. The autoclave is then closed and placed in a 120° C. oil bath for 12 hours under autogenous pressure. After the reaction is completed, it is cooled to room temperature, and a yellow product is taken out. The crude product is first dissolved in DMSO to 240° C. A polymer is precipitated in methanol, washed three times to obtain a pure product without catalyst, and dried under vacuum to constant weight. The conversion rate is calculated and obtained by the weighing method. The composition of each link in the polymer is detected by nuclear magnetic resonance spectroscopy. The molecular weight and molecular weight distribution of the polymer are determined by high temperature gel chromatography. The melting temperature of the polymer is determined by DSC. The crystallinity of the polymer is determined by X-ray diffraction. The test results are shown in Table 1.

Embodiment 11: One-Pot Copolymerization of $CS_2$/EO to Synthesize Polythiocarbonate Before the polymerization, a 10 mL autoclave is placed at 110° C. for about 2 hours to remove water and cooled to room temperature in a desiccator. Several masses of Lewis acid A1 and initiator 4-dimethylaminopyridine (DMAP) are sequentially added to the autoclave in equimolar quantities. The molar ratio of initiator to monomer EO is 1/2000. 2 mL of $CS_2$ and 1.1 mL of EO (molar ratio of $CS_2$ to EO being 1.5:1) are added. The autoclave is then closed and placed in a 60° C. oil bath for 12 hours under autogenous pressure. After the reaction is completed, it is cooled to room temperature, and a yellow product is taken out. The crude product is first dissolved in DMSO to 240° C. A polymer is precipitated in methanol, washed three times to obtain a pure product without catalyst, and dried under vacuum to constant weight. The conversion rate is calculated and obtained by the weighing method. The composition of each link in the polymer is detected by nuclear magnetic resonance spectroscopy. The molecular weight and molecular weight distribution of the polymer are determined by high temperature gel chromatography. The melting temperature of the polymer is determined by DSC. The crystallinity of the polymer is determined by X-ray diffraction. The test results are shown in Table 1.

Embodiment 12: One-Pot Copolymerization of $CS_2$/EO to Synthesize Polythiocarbonate Before the polymerization, a 10 mL autoclave is placed at 110° C. for about 2 hours to remove water and cooled to room temperature in a desiccator. Several masses of Lewis acid A1 and initiator hexadecyltrimethylammonium bromide (CTAB) are sequentially added to the autoclave in equimolar quantities. The molar ratio of initiator to monomer EO is 1/2000. 2 mL of $CS_2$ and 1.1 mL of EO (molar ratio of $CS_2$ to EO being 1.5:1) are added. The autoclave is then closed and placed in a 120° C. oil bath for 12 hours under autogenous pressure. After the reaction is completed, it is cooled to room temperature, and a yellow product is taken out. The crude product is first dissolved in DMSO to 240° C. A polymer is precipitated in methanol, washed three times to obtain a pure product without catalyst, and dried under vacuum to constant weight. The conversion rate is calculated and obtained by the weighing method. The composition of each link in the polymer is detected by nuclear magnetic resonance spectroscopy. The molecular weight and molecular weight distribution of the polymer are determined by high temperature gel chromatography. The melting temperature of the polymer is determined by DSC. The crystallinity of the polymer is determined by X-ray diffraction. The test results are shown in Table 1.

Embodiment 13: One-Pot Copolymerization of $CS_2$/EO to Synthesize Polythiocarbonate Before the polymerization, a 10 mL autoclave is placed at 110° C. for about 2 hours to remove water and cooled to room temperature in a desiccator. Several masses of Lewis acid A1 and initiator bis(triphenylphosphinyl)ammonium chloride ([PPN]Cl) are sequentially added to the autoclave in equimolar quantities. The molar ratio of initiator to monomer EO is 1/2000. 2 mL of $CS_2$ and 1.1 mL of EO (molar ratio of $CS_2$ to EO being 1.5:1) are added. The autoclave is then closed and placed in an 80° C. oil bath for 12 hours under autogenous pressure. After the reaction is completed, it is cooled to room temperature, and a yellow product is taken out. The crude product is first dissolved in DMSO to 240° C. A polymer is precipitated in methanol, washed three times to obtain a pure product without catalyst, and dried under vacuum to constant weight. The conversion rate is calculated and obtained by the weighing method. The composition of each link in the polymer is detected by nuclear magnetic resonance spectroscopy. The molecular weight and molecular weight distribution of the polymer are determined by high temperature gel chromatography. The melting temperature of the polymer is determined by DSC. The crystallinity of the polymer is determined by X-ray diffraction. The test results are shown in Table 1.

Embodiment 14: One-Pot Copolymerization of $CS_2$/EO to Synthesize Polythiocarbonate Before the polymerization, a 10 mL autoclave is placed at 110° C. for about 2 hours to remove water and cooled to room temperature in a desiccator. Several masses of Lewis acid A1 and initiator N,N,N',N'-Tetramethylmethanediamine (TMDM) are sequentially added to the autoclave with a molar ratio of 1:0.5 (1:1 for the number ratio of boron to nitrogen). The molar ratio of Lewis acid to monomer EO is 1/2000. 2 mL of $CS_2$ and 1.1 mL of EO (molar ratio of $CS_2$ to EO being 1.5:1) are added. The autoclave is then closed and placed in a 40° C. oil bath for 12 hours under autogenous pressure. After the reaction is completed, it is cooled to room temperature, and a yellow product is taken out. The crude product is first dissolved in DMSO to 240° C. A polymer is precipitated in methanol, washed three times to obtain a pure product without catalyst, and dried under vacuum to constant weight. The conversion rate is calculated and obtained by the weighing method. The composition of each link in the polymer is detected by nuclear magnetic resonance spectroscopy. The molecular weight and molecular weight distribution of the polymer are determined by high temperature gel chromatography. The melting temperature of the polymer is determined by DSC. The crystallinity of the polymer is determined by X-ray diffraction. The test results are shown in Table 1.

Embodiment 15: One-Pot Copolymerization of $CS_2$/EO to Synthesize Polythiocarbonate Before the polymerization, a 10 mL autoclave is placed at 110° C. for about 2 hours to remove water and cooled to room temperature in a desiccator. Several masses of Lewis acid A1 and initiator N,N,N',N'-Tetraethyl ethylenediamine (TEED) are sequentially added to the autoclave with a molar ratio of 1:0.5 (1:1 for the number ratio of boron to nitrogen). The molar ratio of Lewis acid to monomer EO is 1/2000. 2 mL of $CS_2$ and 1.1 mL of EO (molar ratio of $CS_2$ to EO being 1.5:1) are added. The autoclave is then closed and placed in an 80° C. oil bath for 12 hours under autogenous pressure. After the reaction is completed, it is cooled to room temperature, and a yellow product is taken out. The crude product is first dissolved in DMSO to 240° C. A polymer is precipitated in methanol, washed three times to obtain a pure product without catalyst, and dried under vacuum to constant weight. The conversion rate is calculated and obtained by the weighing method. The composition of each link in the polymer is detected by nuclear magnetic resonance spectroscopy. The molecular weight and molecular weight distribution of the polymer are determined by high temperature gel chromatography. The melting temperature of the polymer is determined by DSC. The crystallinity of the polymer is determined by X-ray diffraction. The test results are shown in Table 1.

Embodiment 16: One-Pot Copolymerization of $CS_2$/EO to Synthesize Polythiocarbonate Before the polymerization, a 10 mL autoclave is placed at 110° C. for about 2 hours to remove water and cooled to room temperature in a desiccator. Several masses of Lewis acid A1 and initiator 1,8-diazabicyclo[5.4.0]undec-7-carbene (DBU) are sequentially added to the autoclave in equimolar quantities. The molar ratio of initiator to monomer EO is 1/2000. 2 mL of $CS_2$ and 1.1 mL of EO (molar ratio of $CS_2$ to EO being 1.5:1) are added. The autoclave is then closed and placed in an 80° C. oil bath for 12 hours under autogenous pressure. After the reaction is completed, it is cooled to room temperature, and a yellow product is taken out. The crude product is first dissolved in DMSO to 240° C. A polymer is precipitated in methanol, washed three times to obtain a pure product without catalyst, and dried under vacuum to constant weight. The conversion rate is calculated and obtained by the weighing method. The composition of each link in the polymer is detected by nuclear magnetic resonance spectroscopy. The molecular weight and molecular weight distribution of the polymer are determined by high temperature gel chromatography. The melting temperature of the polymer is determined by DSC. The crystallinity of the polymer is determined by X-ray diffraction. The test results are shown in Table 1.

Embodiment 17: One-Pot Copolymerization of CS2/EO to Synthesize Polythiocarbonate Before the polymerization, a 10 mL autoclave is placed at 110° C. for about 2 hours to remove water and cooled to room temperature in a desiccator. 2.2 mL of tetrahydrofuran, several masses of Lewis acid A1 and initiator 1,8-diazabicyclo[5.4.0]undec-7-carbene (DBU) are sequentially added to the autoclave, wherein the Lewis acid A1 and the DBU are in equimolar quantities. The molar ratio of initiator to monomer EO is 1/2000. 2 mL of $CS_2$ and 1.1 mL of EO (molar ratio of $CS_2$ to EO being 1.5:1) are added. The autoclave is then closed and placed in an 80° C. oil bath for 12 hours under autogenous pressure. After the reaction is completed, it is cooled to room temperature, and a yellow product is taken out. The crude product is first dissolved in DMSO to 240° C. A polymer is precipitated in methanol, washed three times to obtain a pure product without catalyst, and dried under vacuum to constant weight. The conversion rate is calculated and obtained by the weighing method. The composition of each link in the polymer is detected by nuclear magnetic resonance spectroscopy. The molecular weight and molecular weight distribution of the polymer are determined by high temperature gel chromatography. The melting temperature of the polymer is determined by DSC. The crystallinity of the polymer is determined by X-ray diffraction. The test results are shown in Table 1.

Figure 3:
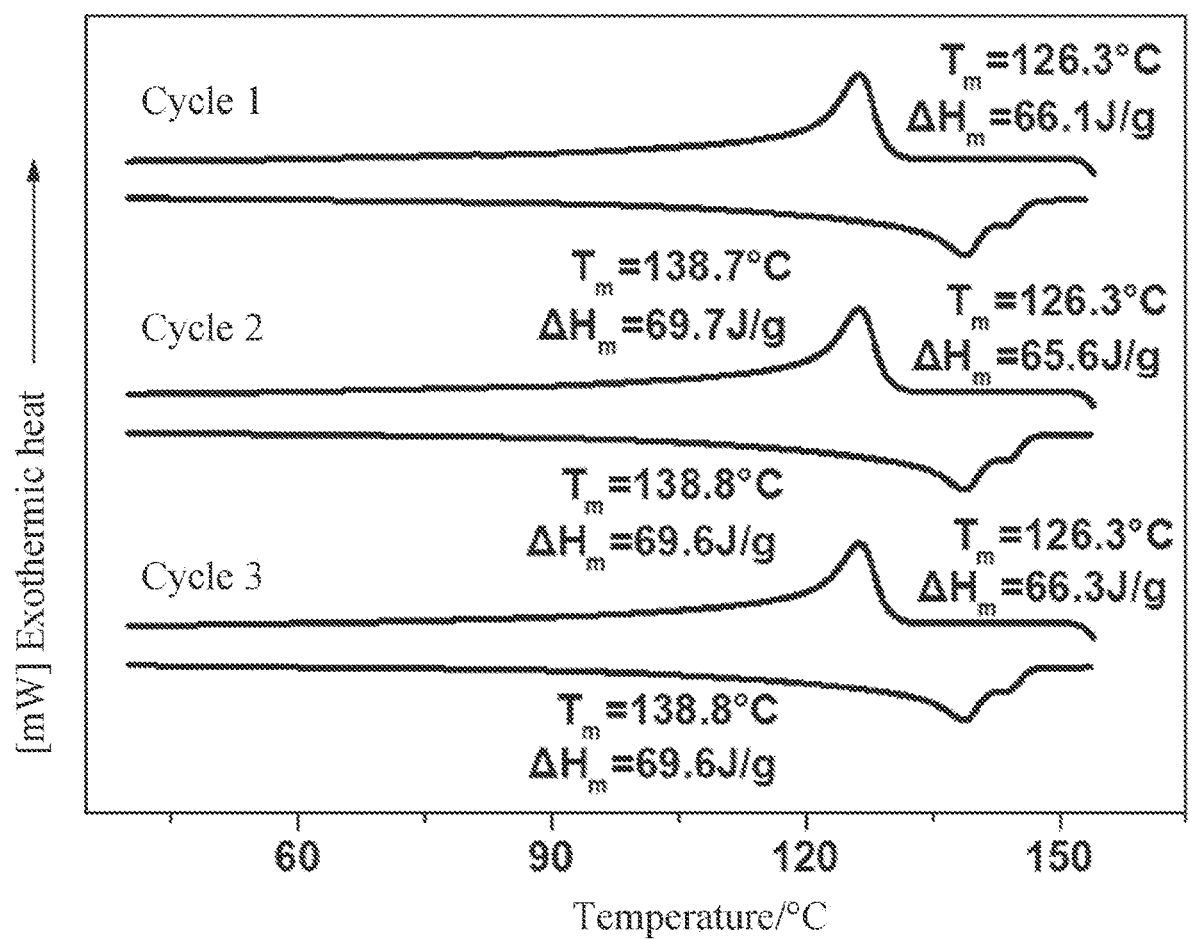
FIG. 3 is a DSC curve of a $CS_2$/EO copolymerization product prepared in Embodiment 17 of the present disclosure.

FIG. 3 is a DSC curve of a $CS_2$/EO copolymerization product prepared in this embodiment. The crystallization properties of the product are found to be stable and reproducible after three warming-cooling cycles.

Embodiment 18: One-Pot Copolymerization of $CS_2$/EO to Synthesize Polythiocarbonate Before the polymerization, a 10 mL autoclave is placed at 110° C. for about 2 hours to remove water and cooled to room temperature in a desiccator. Several masses of Lewis acid A1 and initiator 1,8-diazabicyclo[5.4.0]undec-7-carbene (DBU) are sequentially added to the autoclave in equimolar quantities. The molar ratio of initiator to monomer EO is 1/2000. 2 mL of $CS_2$ and 1.1 mL of EO (molar ratio of $CS_2$ to EO being 1.5:1) are added. The autoclave is then closed and placed in a 150° C. oil bath for 12 hours under autogenous pressure. After the reaction is completed, it is cooled to room temperature, and a yellow product is taken out. The crude product is first dissolved in DMSO to 240° C. A polymer is precipitated in methanol, washed three times to obtain a pure product without catalyst, and dried under vacuum to constant weight. The conversion rate is calculated and obtained by the weighing method. The composition of each link in the polymer is detected by nuclear magnetic resonance spectroscopy. The molecular weight and molecular weight distribution of the polymer are determined by high temperature gel chromatography. The melting temperature of the polymer is determined by DSC. The crystallinity of the polymer is determined by X-ray diffraction. The test results are shown in Table 1.

Embodiment 19: One-Pot Copolymerization of $CS_2$/EO to Synthesize Polythiocarbonate Before the polymerization, a 10 mL autoclave is placed at 110° C. for about 2 hours to remove water and cooled to room temperature in a desiccator. Several masses of Lewis acid A1 and initiator 1,8-diazabicyclo[5.4.0]undec-7-carbene (DBU) are sequentially added to the autoclave in equimolar quantities. The molar ratio of initiator to monomer EO is 1/2000. 2 mL of $CS_2$ and 1.1 mL of EO (molar ratio of $CS_2$ to EO being 1.5:1) are added. The autoclave is then closed and placed in a 100° C. oil bath for 12 hours under autogenous pressure. After the reaction is completed, it is cooled to room temperature, and a yellow product is taken out. The crude product is first dissolved in DMSO to 240° C. A polymer is precipitated in methanol, washed three times to obtain a pure product without catalyst, and dried under vacuum to constant weight. The conversion rate is calculated and obtained by the weighing method. The composition of each link in the polymer is detected by nuclear magnetic resonance spectroscopy. The molecular weight and molecular weight distribution of the polymer are determined by high temperature gel chromatography. The melting temperature of the polymer is determined by DSC. The crystallinity of the polymer is determined by X-ray diffraction. The test results are shown in Table 1.

Embodiment 20: One-Pot Copolymerization of $CS_2$/EO to Synthesize Polythiocarbonate Before the polymerization, a 10 mL autoclave is placed at 110° C. for about 2 hours to remove water and cooled to room temperature in a desiccator. Several masses of Lewis acid A1 and initiator 1,8-diazabicyclo[5.4.0]undec-7-carbene (DBU) are sequentially added to the autoclave in equimolar quantities. The molar ratio of initiator to monomer EO is 1/2000. 2 mL of $CS_2$ and 1.1 mL of EO (molar ratio of CS$_2$ to EO being 1.5:1) are added. The autoclave is then closed and placed in a 0° C. oil bath for 12 hours under autogenous pressure. After the reaction is completed, it is cooled to room temperature, and a yellow product is taken out. The crude product is first dissolved in DMSO to 240° C. A polymer is precipitated in methanol, washed three times to obtain a pure product without catalyst, and dried under vacuum to constant weight. The conversion rate is calculated and obtained by the weighing method. The composition of each link in the polymer is detected by nuclear magnetic resonance spectroscopy. The molecular weight and molecular weight distribution of the polymer are determined by high temperature gel chromatography. The melting temperature of the polymer is determined by DSC. The crystallinity of the polymer is determined by X-ray diffraction. The test results are shown in Table 1.

Embodiment 21: One-Pot Copolymerization of CS$_2$/EO/Propylene Oxide to Synthesize Polythiocarbonate Before the polymerization, a 10 mL autoclave is placed at 110° C. for about 2 hours to remove water and cooled to room temperature in a desiccator. Several masses of Lewis acid A1 and initiator 1,8-diazabicyclo[5.4.0]undec-7-carbene (DBU) are sequentially added to the autoclave in equimolar quantities. The molar ratio of initiator to monomer EO is 1/2000. 2 mL of CS$_2$ and 1.1 mL of EO (molar ratio of CS$_2$ to EO being 1.5:1) and 100 µL of third monomer propylene oxide (molar ratio of propylene oxide to EO being 5:100) are added. The autoclave is then closed and placed in an 80° C. oil bath for 12 hours under autogenous pressure. After the reaction is completed, it is cooled to room temperature, and a yellow product is taken out. The crude product is first dissolved in DMSO to 240° C. A polymer is precipitated in methanol, washed three times to obtain a pure product without catalyst, and dried under vacuum to constant weight. The conversion rate is calculated and obtained by the weighing method. The composition of each link in the polymer is detected by nuclear magnetic resonance spectroscopy. The molecular weight and molecular weight distribution of the polymer are determined by high temperature gel chromatography. The melting temperature of the polymer is determined by DSC. The crystallinity of the polymer is determined by X-ray diffraction. The test results are shown in Table 1.

Embodiment 22: One-Pot Copolymerization of CS$_2$/EO Maleic Anhydride to Synthesize Polythiocarbonate Before the polymerization, a 10 mL autoclave is placed at 110° C. for about 2 hours to remove water and cooled to room temperature in a desiccator. Several masses of Lewis acid Al and initiator 1,8-diazabicyclo[5.4.0]undec-7-carbene (DBU) are sequentially added to the autoclave in equimolar quantities. The molar ratio of initiator to monomer EO is 1/2000. 2 mL of CS$_2$ and 1.1 mL of EO (molar ratio of CS$_2$ to EO being 1.5:1) and 282 mg of third monomer maleic anhydride (molar ratio of maleic anhydride to EO being 10:100) are added. The autoclave is then closed and placed in an 80° C. oil bath for 12 hours under autogenous pressure. After the reaction is completed, it is cooled to room temperature, and a yellow product is taken out. The crude product is first dissolved in DMSO to 240° C. A polymer is precipitated in methanol, washed three times to obtain a pure product without catalyst, and dried under vacuum to constant weight. The conversion rate is calculated and obtained by the weighing method. The composition of each link in the polymer is detected by nuclear magnetic resonance spectroscopy. The molecular weight and molecular weight distribution of the polymer are determined by high temperature gel chromatography. The melting temperature of the polymer is determined by DSC. The crystallinity of the polymer is determined by X-ray diffraction. The test results are shown in Table 1.

Embodiment 23: One-Pot Two-step Copolymerization of CS$_2$/EO Lactide to Synthesize Polythiocarbonate Before the polymerization, a 10 mL autoclave is placed at 110° C. for about 2 hours to remove water and cooled to room temperature in a desiccator. Several masses of Lewis acid A1 and initiator 1,8-diazabicyclo[5.4.0]undec-7-carbene (DBU) are sequentially added to the autoclave in equimolar quantities. 828 mg of a third monomer lactide is added. The autoclave is closed and placed in an 80° C. oil bath for 12 hours under autogenous pressure. The autoclave is cooled to room temperature and 1.1 mL of EO and 2 mL of CS$_2$ (molar ratio of CS$_2$ to EO being 1.5:1) are added. The autoclave is then closed and placed in an 80° C. oil bath for 12 hours under autogenous pressure to complete a second stage of polymerization. After the reaction is completed, it is cooled to room temperature, and a yellow product is taken out. The crude product is first dissolved in DMSO to 240° C. A polymer is precipitated in methanol, washed three times to obtain a pure product without catalyst, and dried under vacuum to constant weight. The conversion rate is calculated and obtained by the weighing method. The composition of each link in the polymer is detected by nuclear magnetic resonance spectroscopy. The molecular weight and molecular weight distribution of the polymer are determined by high temperature gel chromatography. The melting temperature of the polymer is determined by DSC. The crystallinity of the polymer is determined by X-ray diffraction. The test results are shown in Table 1.

Embodiment 24: One-Pot Copolymerization of CS$_2$/EO/PEG2000 to synthesize Polythiocarbonate Before the polymerization, a 10 mL autoclave is placed at 110° C. for about 2 hours to remove water and cooled to room temperature in a desiccator. Several masses of Lewis acid A1 and initiator 1,8-diazabicyclo[5.4.0]undec-7-carbene (DBU) are sequentially added to the autoclave in equimolar quantities. The molar ratio of initiator to monomer EO is 1/2000. 2 mL of CS$_2$ and 1.1 mL of EO (molar ratio of CS$_2$ to EO being 1.5:1) and 2.87 g of chain transfer agent polyethylene glycol 2000 (PEG2000) (molar ratio of PEG2000 to EO being 5:100) are added. The autoclave is then closed and placed in an 80° C. oil bath for 12 hours under autogenous pressure. After the reaction is completed, it is cooled to room temperature, and a yellow product is taken out. The crude product is first dissolved in DMSO to 240° C. A polymer is precipitated in methanol, washed three times to obtain a pure product without catalyst, and dried under vacuum to constant weight. The conversion rate is calculated and obtained by the weighing method. The composition of each link in the polymer is detected by nuclear magnetic resonance spectroscopy. The molecular weight and molecular weight distribution of the polymer are determined by high temperature gel chromatography. The melting temperature of the polymer is determined by DSC. The crystallinity of the polymer is determined by X-ray diffraction. The test results are shown in Table 1.

TABLE 1

| No. | T (° C.) | Lewis acid[1] | Initiator[2] | Initiator/ EO/CS$_2$[3] | t(h) | $M_n$[4] (kg/mol) | PDI[5] | L$_1$:L$_2$:L$_3$: L$_4$:L$_5$[6] | $T_m$[7] (° C.) | Crystallinity (%)[8] |
|---|---|---|---|---|---|---|---|---|---|---|
| Embodiment 1 | 80 | A1 | DBU | 1:2000:3000 | 12.0 | 46.1 | 1.4 | 43:37:7:8:5 | 168 | 67 |
| Embodiment 2 | 80 | A2 | DBU | 1:100:500 | 0.5 | 8.4 | 2.3 | 28:54:6:7:5 | 205 | 56 |
| Embodiment 3 | 80 | A3 | DBU | 1:1000:1000 | 48.0 | 3.0 | 2.8 | 62:21:5:4:8 | 130 | 43 |
| Embodiment 4 | 80 | A4 | DBU | 1:2000:1000 | 4.0 | 1.4 | 1.3 | 36:42:7:8:7 | 179 | 28 |
| Embodiment 5 | 80 | A5 | DBU | 1:500:1500 | 24.0 | 16.4 | 3.2 | 34:48:5:6:7 | 193 | 55 |
| Embodiment 6 | 80 | A6 | DBU | 1:4000:6000 | 48.0 | 98.0 | 4.4 | 68:15:5:4:8 | 124 | 50 |
| Embodiment 7 | 80 | A7 | DBU | 1:2000:4000 | 10.0 | 38.4 | 2.7 | 39:42:9:6:4 | 173 | 52 |
| Embodiment 8 | 80 | A8 | DBU | 1:750:975 | 10.0 | 29.8 | 3.3 | 25:61:4:3:7 | 224 | 46 |
| Embodiment 9 | 80 | A9 | DBU | 1:2000:2000 | 8.0 | 33.6 | 4.6 | 63:13:11:6:7 | 128 | 53 |
| Embodiment 10 | 120 | A1 | TBD | 1:2000:3000 | 12.0 | 25.3 | 2.0 | 43:45:4:2:6 | 184 | 72 |
| Embodiment 11 | 60 | A1 | DMAP | 1:2000:3000 | 12.0 | 70.2 | 1.6 | 52:35:5:4:4 | 148 | 31 |
| Embodiment 12 | 120 | A1 | CTAB | 1:2000:3000 | 12.0 | 27.9 | 1.4 | 40:41:6:6:7 | 147 | 41 |
| Embodiment 13 | 80 | A1 | PPNCl | 1:2000:3000 | 12.0 | 16.4 | 2.2 | 47:28:9:6:10 | 148 | 53 |
| Embodiment 14 | 40 | A1 | TMDM | 1:2000:3000 | 12.0 | 6.5 | 1.6 | 17:69:4:2:8 | 235 | 24 |
| Embodiment 15 | 80 | A1 | TEED | 1:2000:3000 | 12.0 | 32.7 | 1.8 | 49:29:12:5:5 | 153 | 19 |
| Embodiment 16 [9] | 80 | A1 | DBU | 1:2000:3000 | 12.0 | 40.4 | 1.4 | 47:32:8:6:7 | 159 | 54 |
| Embodiment 17 [10] | 80 | A1 | DBU | 1:2000:3000 | 12.0 | 32.3 | 1.3 | 57:25:6:4:8 | 138 | 58 |
| Embodiment 18 | 150 | A1 | DBU | 1:2000:3000 | 12.0 | 29.7 | 3.4 | 11:80:2:5:2 | 245 | 78 |
| Embodiment 19 | 100 | A1 | DBU | 1:2000:3000 | 12.0 | 35.6 | 2.0 | 37:46:7:5:5 | 185 | 63 |
| Embodiment 20 | 0 | A1 | DBU | 1:2000:3000 | 12.0 | 3.9 | 1.1 | 80:10:3:2:5 | 117 | 28 |
| Embodiment 21 [11] | 80 | A1 | DBU | 1:2000:3000 | 12.0 | 84.2 | 2.8 | 71:15:4:7:3 | 120 | 34 |
| Embodiment 22 [12] | 80 | A1 | DBU | 1:2000:3000 | 12.0 | 72.5 | 2.3 | 33:57:4:3:3 | 216 | 9 |
| Embodiment 23 [13] | 80 | A1 | DBU | 1:2000:3000 | 24.0 | 55.8 | 2.2 | 39:41:7:8:5 | 160 | 57 |
| Embodiment 24 [14] | 80 | A1 | DBU | 1:2000:3000 | 12.0 | 18.3 | 1.2 | 47:32:6:8:7 | 157 | 51 | where: [1]Speicies of Lewis acid. [2]Speicies of Lewis base initiator. The amount of substance of the added initiator is the same as that of the added Lewis acid. DBU=1,8-diazabicyclo[5.4.0]undec-7-carbene, TBD=1,5,7-diazabicyclo[5.4.0]undec-7-carbene, DMAP=4-dimethylaminopyridine, CTAB=hexadecyltrimethylammonium bromide, [PPN]Cl=bis(triphenylphosphinyl)ammonium chloride, TMDM=N,N,N',N'-Tetramethylmethanediamine, TEED=N, N,N',N'-Tetraethyl ethylenediamine. [3]Molar ratio of initiator, ethylene oxide to carbon disulfide. [4]$M_n$: number-average molecular weight, determined by gel permeation chromatography. [5]PDI: molecular weight distribution, determined by gel permeation chromatography. [6]Composition ratio of polymeric thiocarbonate and carbonate links, determined by nuclear magnetic resonance spectroscopy. [7]$T_m$: melting temperature, determined by differential scanning calorimetry method. [8]Crystallinity, estimated by XRD. [9]Tetrahydrofuran as a solvent, the ratio of tetrahydrofuran to ethylene oxide is 1:1. [10]Tetrahydrofuran as a solvent, the ratio of tetrahydrofuran to ethylene oxide is 2:1. [11]Propylene oxide as a third monomer, the ratio of propylene oxide to ethylene oxide is 5:100. [12]Maleic anhydride as a third monomer, the ratio of maleic anhydride to ethylene oxide is 10:100. [13]Lactide as a third monomer, the ratio of lactide to ethylene oxide is 20:100, and the polymerization is completed by one-pot two-step method. [14]Bishydroxyl polyethylene glycol having a molecular weight of 2000 as a chain transfer agent, the ratio of PEG2000 to ethylene oxide is 5:100.

What is claimed is:

1. A crystalline polythiocarbonate, being a random copolymer and comprising five structural units L1 to L5 as shown in the following formula:

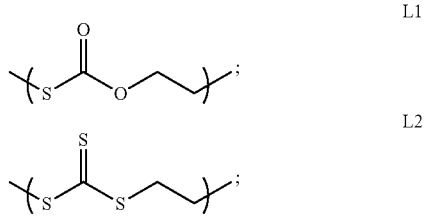

L3

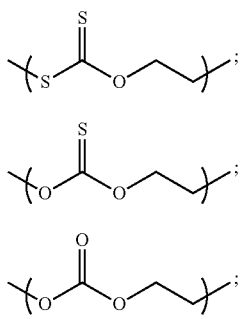

L4

(structure)

L5

(structure)

wherein the structural unit L1 has a molar content of 10-80%, the structural unit L2 has a molar content of 10-80%, the structural unit L3 has a molar content greater than 0% and less than 15%, the structural unit L4 has a molar content greater than 0% and less than 10%, and the structural unit L5 has a molar content greater than 0% and less than or equal to 10%;

the crystalline polythiocarbonate has a crystallinity of 1-78% and a melting temperature of 117-245° C.

2. The crystalline polythiocarbonate according to claim 1, wherein the structural unit L1 has a molar content of 30-55%, and the structural unit L2 has a molar content of 30-55%.

3. The crystalline polythiocarbonate according to claim 1, wherein molecular chain segments of the crystallizable polythiocarbonate further comprises, a polyether or a polyester link derived from a copolymerization of a third monomer;

the third monomer is selected from at least one of: an epoxy compound, a cyclic anhydride, and a cyclic lactone.

4. The crystalline polythiocarbonate according to claim 1, wherein the crystallizable polythiocarbonate has a number-average molecular weight of 1-100 kg/mol and a molecular weight distribution of 1.1-5.0.

5. A preparation method of a crystalline polythiocarbonate, comprising:

co-mixing carbon disulfide, ethylene oxide, an initiator, and a Lewis acid in a reactor, and carrying out a native or solution copolymerization reaction at 0-150° C. under autogenous pressure;

wherein the crystalline polythiocarbonate is a random copolymer and comprises five structural units L1 to L5 as shown in the following formula:

L1

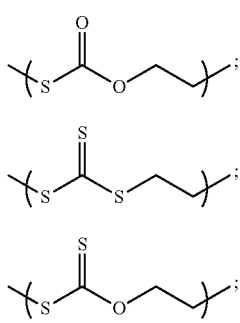

L2

(structure)

L3

(structure)

L4

(structure)

L5

(structure)

the structural unit L1 has a molar content of 10-80%, the structural unit L2 has a molar content of 10-80%, the structural unit L3 has a molar content greater than 0% and less than 15%, the structural unit L4 has a molar content greater than 0% and less than 10%, and the structural unit L5 has a molar content greater than 0% and less than or equal to 10%;

the crystalline polythiocarbonate has a crystallinity of 1-78% and a melting temperature of 117-245° C.

6. The method according to claim 5, wherein in the co-mixing the carbon disulfide, the ethylene oxide, the initiator, and the Lewis acid in the reactor, a third monomer is further added to be co-mixed with the carbon disulfide, the ethylene oxide, the initiator, and the Lewis acid;

the third monomer is selected from at least one of an epoxy compound, a cyclic anhydride, and a cyclic lactone;

the epoxy compound is selected from at least one of propylene oxide, alpha-alkylene oxide from C5 to C20, allyl glycidyl ether, 1,2-epoxybutane, epichlorohydrin, epoxyisobutane, epoxycyclohexane, 4-vinylcyclohexane oxide, limonene oxide, cyclopentane oxide, styrene oxide, and alkyl substituted styrene oxide;

the cyclic anhydride is selected from at least one of maleic anhydride, glutaric anhydride, succinic anhydride, diglycolic anhydride, and phthalic anhydride;

the cyclic lactone is selected from at least one of ethyl cross-ester, propyl cross-ester, butyl lactone, amyl lactone, hexyl lactone, heptyl lactone, and dimethyl trimethylene ester.

7. The method according to claim 5, wherein in the co-mixing the carbon disulfide, the ethylene oxide, the initiator, and the Lewis acid in the reactor, a solvent is further added to be co-mixed with the carbon disulfide, the ethylene oxide, the initiator, and the Lewis acid;

the initiator is selected from at least one of 1,8-diazabicycloundec-7-carbene, 1,5,7-diazabicyclo[5.4.0]undec-7-carbene, 4-dimethylaminopyridine, tetraalkylammonium halide, bis(triphenylphosphinyl)ammonium chloride, N,N,N',N'-tetramethylmethylenediamine, N,N,N',N'-tetraethylethylenediamine, and tetraalkylphosphine halide;

the Lewis acid is selected from at least one of triethylboron, tripropylboron, tributylboron, triphenylboron, tris(pentafluorophenyl)boron, bis(trimethylphenyl)fluoride boron, trimethylaluminum, triethylaluminum, and 3,5-Di-tert-butylsalicylaldehyde imide Schiff base chromium complex;

the solvent is selected from at least one of tetrahydrofuran, dimethyl sulfoxide, trichlorobenzene, and dimethylformamide.

8. The method according to claim 5, wherein in the co-mixing the carbon disulfide, the ethylene oxide, the initiator, and the Lewis acid in the reactor, a chain transfer agent is further added to be co-mixed with the carbon disulfide, the ethylene oxide, the initiator, and the Lewis acid;
the chain transfer agent is selected from at least one of water, alcohol, organic carboxylic acid, and remote claw polymer.

9. The method according to claim 5, wherein in the co-mixing the carbon disulfide, the ethylene oxide, the initiator, and the Lewis acid in the reactor, a third monomer is further added to be co-mixed with the carbon disulfide, the ethylene oxide, the initiator, and the Lewis acid;
a molar ratio of carbon disulfide to ethylene oxide is 0.5-5:1;
a molar ratio of the third monomer to ethylene oxide is 0-100:100;
a molar ratio of initiator to ethylene oxide is 1:100-4000, and the molar ratio of the initiator to the Lewis acid is 1:0.5-2.

10. The method according to claim 5, wherein the structural unit L1 has a molar content of 30-55%, and the structural unit L2 has a molar content of 30-55%.

11. The method according to claim 5, wherein molecular chain segments of the crystallizable polythiocarbonate further comprises, a polyether or a polyester link derived from a copolymerization of a third monomer;
the third monomer is selected from at least one of: an epoxy compound, a cyclic anhydride, and a cyclic lactone.

12. The method according to claim 5, wherein the crystallizable polythiocarbonate has a number-average molecular weight of 1-100 kg/mol and a molecular weight distribution of 1.1-5.0.

13. A preparation method of a crystalline polythiocarbonate, comprising:
co-mixing an initiator, a Lewis acid, and a third monomer in a reactor and carrying out a native or solution copolymerization reaction at 0-150° C. under autogenous pressure, to obtain a polyether intermediate or a polyester intermediate with a target molecular weight; and
co-mixing the polyether intermediate or the polyester intermediate with the target molecular weight with carbon disulfide and ethylene oxide in the reactor, carrying out a second stage reaction in a native or solution at 0-150° C. under autogenous pressure, and obtaining a final product by post-processing;
wherein the crystalline polythiocarbonate is a random copolymer and comprises five structural units L1 to L5 as shown in the following formula:

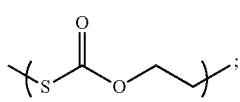  L1

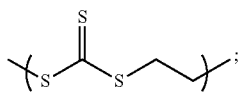  L2

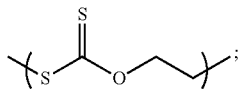  L3

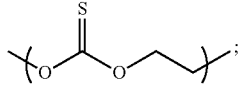  L4

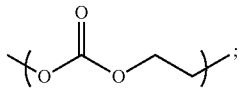  L5 the structural unit L1 has a molar content of 10-80%, the structural unit L2 has a molar content of 10-80%, the structural unit L3 has a molar content greater than 0% and less than 15%, the structural unit L4 has a molar content greater than 0% and less than 10%, and the structural unit L5 has a molar content greater than 0% and less than or equal to 10%;
the crystalline polythiocarbonate has a crystallinity of 1-78% and a melting temperature of 117-245° C.;
the molecular chain segments of the crystallizable polythiocarbonate further comprises, a polyether or a polyester link derived from a copolymerization of the third monomer;
the third monomer is selected from at least one of: an epoxy compound, a cyclic anhydride, and a cyclic lactone.

14. The method according to claim 13, wherein the third monomer is selected from at least one of an epoxy compound, a cyclic anhydride, and a cyclic lactone;
the epoxy compound is selected from at least one of propylene oxide, alpha-alkylene oxide from C5 to C20, allyl glycidyl ether, 1,2-epoxybutane, epichlorohydrin, epoxyisobutane, epoxycyclohexane, 4-vinylcyclohexane oxide, limonene oxide, cyclopentane oxide, styrene oxide, and alkyl substituted styrene oxide;
the cyclic anhydride is selected from at least one of maleic anhydride, glutaric anhydride, succinic anhydride, diglycolic anhydride, and phthalic anhydride;
the cyclic lactone is selected from at least one of ethyl cross-ester, propyl cross-ester, butyl lactone, amyl lactone, hexyl lactone, heptyl lactone, and dimethyl trimethylene ester.

15. The method according to claim 13, wherein in the co-mixing the initiator, the Lewis acid, and the third monomer in the reactor, a first solvent is further added to be co-mixed with the initiator, the Lewis acid, and the third monomer;
in the co-mixing the polyether intermediate or the polyester intermediate with the target molecular weight with carbon disulfide and ethylene oxide in the reactor, a second solvent is further added to be co-mixed with the polyether intermediate or the polyester intermediate, the carbon disulfide, and the ethylene oxide;
the initiator is selected from at least one of 1,8-[5.4.0] undec-7-carbene, 1,5,7-diazabicycloundec-7-carbene, 4-dimethylaminopyridine, tetraalkylammonium halide, bis(triphenylphosphinyl)ammonium chloride, N,N,N', N'-tetramethylmethylenediamine, N,N,N',N'-tetraethylethylenediamine, and tetraalkylphosphine halide;
the Lewis acid is selected from at least one of triethylboron, tripropylboron, tributylboron, triphenylboron, tris(pentafluorophenyl)boron, bis(trimethylphenyl) fluoride boron, trimethylaluminum, triethylaluminum, and 3,5-Di-tert-butylsalicylaldehyde imide Schiff base chromium complex;
each of the first solvent and the second solvent is selected from at least one of tetrahydrofuran, dimethyl sulfoxide, trichlorobenzene, and dimethylformamide.

16. The method according to claim 13, wherein, a molar ratio of carbon disulfide to ethylene oxide is 0.5-5:1;

a molar ratio of the third monomer to ethylene oxide is 0-100:100;

a molar ratio of initiator to ethylene oxide is 1:100-4000, and the molar ratio of the initiator to the Lewis acid is 1:0.5-2.

17. The method according to claim 13, wherein the crystallizable polythiocarbonate has a number-average molecular weight of 1-100 kg/mol and a molecular weight distribution of 1.1-5.0.

* * * * *